United States Patent [19]

Miyamoto et al.

[11] Patent Number: 5,373,492
[45] Date of Patent: Dec. 13, 1994

[54] OPTICAL INFORMATION RECORDING/REPRODUCING APPARATUS

[75] Inventors: Moritoshi Miyamoto; Masato Inoue, both of Kawasaki, Japan

[73] Assignee: Canon Kabushiki Kaisha, Tokyo, Japan

[21] Appl. No.: 20,380

[22] Filed: Feb. 22, 1993

[30] Foreign Application Priority Data

Feb. 28, 1992 [JP] Japan .................................. 4-075775
Mar. 31, 1992 [JP] Japan .................................. 4-104046
Jun. 25, 1992 [JP] Japan .................................. 4-190304

[51] Int. Cl.$^5$ ............................................ G11B 7/125
[52] U.S. Cl. ........................... 369/112; 369/118; 369/122; 259/209
[58] Field of Search ............... 369/112, 110, 117, 118, 369/119, 121, 122; 359/204, 196, 209, 210, 211

[56] References Cited

U.S. PATENT DOCUMENTS

| | | | |
|---|---|---|---|
| 4,074,085 | 2/1978 | Russell | 369/110 |
| 4,383,168 | 5/1983 | Luck, Jr. | 359/209 |
| 4,960,313 | 10/1990 | Yamanaka | 359/211 |
| 5,124,829 | 6/1992 | Ishikawa | 359/204 |
| 5,251,055 | 10/1993 | Koide | 359/204 |
| 5,255,115 | 10/1993 | Kikuchi | 359/209 |

FOREIGN PATENT DOCUMENTS 0339722 11/1989 European Pat. Off. .
4-245038 9/1992 Japan .

OTHER PUBLICATIONS

Patent Abstracts of Japan, Kokai No. 58-17550, vol. 7, No. 90, Apr. 1983.
Patent Abstracts of Japan, Kokai No. 60-251525, vol. 10, No. 124, May 1986.
Patent Abstracts of Japan, Kokai No. 01-154326, vol. 13, No. 422, Sep. 1989.
Patent Abstracts of Japan, Kokai No. 02-66733, vol. 14, No. 253, May 1990.
Silverstein, et al., "Rotating Wedge Active Alignment in a Dual Spot Optical Head," 2244 Research Disclosure, No. 308, p. 983, Dec. 1989.
Patent Abstracts of Japan, Kokai No. 01-298538, vol. 14, No. 92, Feb. 1990.
Patent Abstracts of Japan, Kokai No. 61-134942, vol. 10, No. 330, Nov. 1986.
Patent Abstracts of Japan, Kokai No. 63-146238, vol. 12, No. 408, Oct. 1988.

Primary Examiner—Paul M. Dzierzynski
Assistant Examiner—Kiet T. Nguyen
Attorney, Agent, or Firm—Fitzpatrick, Cella, Harper & Scinto

[57] ABSTRACT

At least two light sources are provided for an optical information recording/reproducing apparatus. The light sources emit a recording light beam and a reproducing light beam to form a recording light spot and a reproducing light spot on a recording medium. A wedge glass plate is interposed in the optical path of the beams. The wedge glass plate is rotated to adjust one or both positions of the recording and reproducing light spots formed on the recording medium.

4 Claims, 15 Drawing Sheets

OPTICAL INFORMATION RECORDING/REPRODUCING APPARATUS

BACKGROUND OF THE INVENTION

1. Field of the Invention

The present invention relates to an optical information recording/reproducing apparatus provided with separate recording and reproducing light sources, which performs recording and/or reproduction of information with respective light beams being radiated from the respective light sources toward an optical information recording medium.

2. Related Background Art

Various optical information recording media are heretofore known for recording and/or reproduction of information with light, for example, those of a disk, a card, a tape, and the like. Some of such optical information recording media may be used both for record and for reproduction, while others may be used only for reproduction. In a case that information is recorded in a recordable medium, an information track is scanned with a light beam modulated according to recording information and converged in the form of a micro spot so that the information may be recorded as an optically detectable information pit string.

When the information is reproduced from the recording medium, the information pit string in the information track is scanned with a light beam spot having a constant power with which no record can be effected on the recording medium, and light reflected from or transmitted through the medium is detected to reproduce the information.

An optical head, which is used for recording and/or for reproduction of information in the recording medium, is arranged movable relative to the recording medium in a direction of the information track and in a direction across the information track direction. The movement of the optical head permits the scanning of an information track with the light beam spot. To converge the light beam spot in the optical head, an objective lens is used, for example. The objective lens is held to be movable independent of the optical head body in a direction of the optical axis of the objective lens (in the focusing direction) and in a direction perpendicular to the optical axis and to the information track direction of the recording medium (in the tracking direction). The objective lens is usually held through an elastic member and is driven to move in the above two directions by an actuator using the magnetic interaction.

Incidentally, among the aforementioned optical information recording media, the optical information recording medium of a card type (as will be referred to as an optical card) has a great future demand as a prospect for an information recording medium having a relatively large capacity and being compact and light, so as to be handy to carry.

FIG. 1 is a schematic plan view of a writing once optical card, and FIG. 2 is an enlarged view of a part of the optical card.

In FIG. 1, a plurality of information tracks 2 are arranged in parallel with the direction of L-F on an information recording surface of an optical card 1. A home position 3 is provided on the information recording surface of the optical card 1 as an access reference position to the information tracks 2. The information tracks 2 are arranged in the order of 2-1, 2-2, 2-3, . . . from the nearest to the home position 3. As shown in FIG. 2, tracking tracks are provided adjacent to the respective information tracks in the order of 4-1, 4-2, 4-3, . . . The tracking tracks 4 are used as a guide for autotracking (as will be hereinafter referred to as AT) in which the beam spot is controlled so as not to deviate from a certain information track during scanning with the light beam spot in information recording and/or reproduction.

The AT servo is carried out as follows: A deviation (AT error) of the light beam spot from the information track is detected in the optical head; the detected signal is subject to negative feedback to a tracking actuator; and the objective lens is moved relative to the optical head body in the tracking direction (direction of D) to make the light beam spot follow the desired information track.

Also, an autofocusing (as will be referred to as AF) servo is carried out to obtain a spot of the light beam in an appropriate size (that is, to make the light beam focused on the optical card surface) on the surface of the optical card during scanning of the information track with the light beam spot in information recording and/or reproduction. The AF servo is performed as follows: A deviation (AF error) of the light beam spot from an in-focus state is detected in the optical head; the detected signal is subject to negative feedback to a focusing actuator; and the objective lens is moved relative to the optical head body in the focusing direction to make the light beam spot focused on the optical card surface.

In FIG. 2, S1, S2, and S3 represent light beam spots. The tracking is conducted using the light spots of S1 and S3, while the focusing and production of information pits in recording, and the reading of the information pits in reproduction are done using the optical spot of S2. In the respective information tracks, 6-1, 6-2, and, 7-1, 7-2 respectively represent left address portions and right address portions preformatted, which are read for identification of the tracks. Numeral 5 designates a data portion, which is numbered as 5-1 or 5-2 in FIG. 2 and in which predetermined information is recorded.

The method of optical information recording is briefly explained here. Roughly classified, the optical information recording methods are of two types. One is a one light source type in which recording and reproduction are carried out with a common light source, and the other is a two light source type in which recording and reproduction are carried out with two different light sources. It is commonly understood that the two light source type is advantageous with respect to degradation of reproducing light and with respect to an increase of process speed, as compared to the one light source type.

FIG. 3 is a schematic drawing of an optical system in an optical head of the two light source type. The two light source type enables prevention of the reproducing light degradation and the high speed recording with provision of separate light sources for recording light and for reproducing light.

In FIG. 3, reference numerals 21, 22 denote semiconductor lasers as light sources. The semiconductor laser 21 emits light with a wavelength of 780 nm, and the semiconductor laser 22 emits light with a wavelength of 830 nm. Numerals 23, 24 designate collimator lenses, 25 a diffraction grating for splitting a light beam, 26 a dichroic prism which transmits P-polarized light of 780 nm and reflects P-polarized light of 830 nm, 27 a beam shaping prism, and 28 a polarization beam splitter. Also, numeral 29 represents a quarter wave plate, 30 an objective lens, 31 a band pass filter which transmits only the light of 780 nm, 32 a stopper, 33 a toric lens, and 34 a photo detector.

Light beams emitted from the semiconductor lasers 21, 22 enter the collimator lenses 23, 24 in the form of a diverging beam to be modified into collimated light beams, respectively. The light of 780 nm then enters the diffraction grating 25 to be split into three effective light beams (a zeroth order diffracted beam and ± first order diffracted beams). The split light beams of 780 nm and the light beam of 830 nm are incident as P-polarized components into a dielectric multilayer film built in a Joint area of the dichroic prism 26 having a spectral property as shown in FIG. 4.

As apparent from FIG. 4, the dichroic prism 26 has such a property that it transmits P-polarized light of 780 nm but reflects P-polarized light of 830 nm. Thus, the light beam of 780 nm is transmitted and the light beam of 830 nm is reflected, so that the light beams are combined with each other to be output as an optical flux from the dichroic prism 26 in the combined state. The optical flux output from the dichroic prism 26 is shaped to have a certain light intensity distribution by the light beam shaping prism 27, and then enters the polarization beam splitter 28.

The polarization beam splitter 28 has such a spectral property as shown in FIG. 5 that it transmits P-polarized light and reflects S-polarized light. The optical flux including the light beams of the two wavelengths is transmitted, because the beams are P-polarized.

Then, the optical flux including the beams of the two wavelengths is changed into an optical flux of circular polarized light when passing through the quarter wave plate 29, and is converged by the objective lens 30. The light beams of 780 nm form three micro beam spots S1 (+ first order diffracted light), S2 (zeroth order diffracted light), and S3 (− first order diffracted light) on the optical card 1, which are used as reproducing light and as signal light for AT and AF controls. The light beam of 830 nm forms a micro beam spot S2 (zeroth order diffracted light) on the optical card 1, which is used as recording light.

Positions of the light beam spots on the optical card 1 are as shown in FIG. 2: The light beam spots S1 and S3 are located on adjacent tracking tracks 4 and the light beam spot S2 is located on an information track 2 between the adjacent tracking tracks. It is preferred as to a positional relation between S2 of 780 nm and S2 of 830 nm that the light beam spot S2 of 830 nm as recording light leads the other in the moving direction. There is, however, no theoretical restriction on the arrangement of the beam spots S2, S2. They are located at the same position in this embodiment. The light beam spots formed on the optical card 1 are reflected to pass through the objective lens 30 to become parallel. The light beams again pass through the quarter wave plate 29 to have a polarization direction rotated by 90 degrees as compared to that upon incidence thereinto. The light beams are incident as S-polarized light beams into the polarization beam splitter 28. Since the splitter 28 reflects S-polarized light as described, the light beams are reflected toward the band pass filter 31. The band-pass filter 31 has such a spectral property that it transmits light near 780 nm as shown in FIG. 6. Thus, the band pass filter 31 transmits the light near 780 nm but reflects light of other wavelengths. The band pass filter 31 guides the light of 780 nm as signals to a detection optical system. The light passing through the band pass filter 31 is converged by the toric lens 31 to enter the photo detector 34. The photo detector 34 is constructed as shown in FIG. 7, which carries out the tracking control with signals received by light receiving elements 11, 13, and the focusing control and the reproduction signal detection with a signal received by a light receiving element 12 which is divided into four sections.

In the example of the optical head as shown in FIG. 3, however, the reproducing light and the recording light are radiated from the respective light sources and a positional deviation is inevitably caused between the reproducing beam spot and the recording beam spot, which results in degradation of reproduction signals.

The positional deviation could be adjusted by moving the light sources to prevent the degradation of reproduction signals. Supposing the focal length of the collimator lens is equivalent to that of the objective lens, which is the case in common optical disk apparatuses, the light source is to be moved by 0.1 $\mu$m for adjustment of position deviation of 0.1 $\mu$m. If the accuracy of submicron order is required, the time and the cost for adjustment would be extremely increased.

SUMMARY OF THE INVENTION

It is an object of the present invention to provide, as means for solving the above-described problems, an optical information recording/reproducing apparatus provided with at least two light sources for emitting a recording beam and a reproducing beam, in which the beams are radiated toward a recording medium to record and/or reproduce information in the medium, in which a wedge glass plate is interposed in an optical path of the beams, and in which the wedge glass plate is rotated to adjust one or both of positions of recording and reproducing light spots formed by the beams on the recording medium.

In the present invention to achieve the above object, the wedge glass plate is interposed for example in a collimated recording beam (in a parallel beam state) with a slight angle of view, and the wedge glass plate is rotated about the optical axis thereof to make the recording light spot move, whereby a positional deviation may be adjusted in the tracking direction between the recording light spot and the reproducing light spot.

The present invention provides, as means for solving the above-described problems, an optical information recording/reproducing apparatus for recording and/or reproduction of information with two beams having wavelengths different from each other, one of which is a diverging beam and the other of which is a parallel beam, being radiated to form respective beam spots on a recording medium, in which a flat parallel glass plate is disposed in the diverging beam, is inclined with respect to the optical axis of the beam, and is rotated about the optical axis, whereby a position of the beam spot obtained from the diverging beam may be adjusted.

The present invention further involves an adjustment method in an optical information recording/reproducing apparatus for recording and/or reproduction of information with two beams having wavelengths different from each other, one of which is a diverging beam and the other of which is a parallel beam, being radiated to form beam spots on a recording medium, in which a flat parallel glass plate is inserted into the diverging beam, is inclined with respect to the optical axis of the beam, and is rotated about the optical axis, whereby a position of the beam spot obtained from the diverging beam may be adjusted.

According to the present invention, the flat parallel glass plate is inserted with an inclination to the optical axis into the optical path of the reproducing light or the recording light in the near parallel state (slightly diverging state) to effect the parallel shift of the path, whereby an apparent object height may be given and an image height corresponding thereto may be obtained.

Using the above fact, the flat parallel glass plate is rotated about the optical axis, whereby the position deviation is finely adjusted in the tracking direction between the recording beam spot and the reproducing beam spot.

DETAILED DESCRIPTION OF THE PREFERRED EMBODIMENTS

There are embodiments according to the present invention explained below in detail with reference to the drawings.

Figure 8:
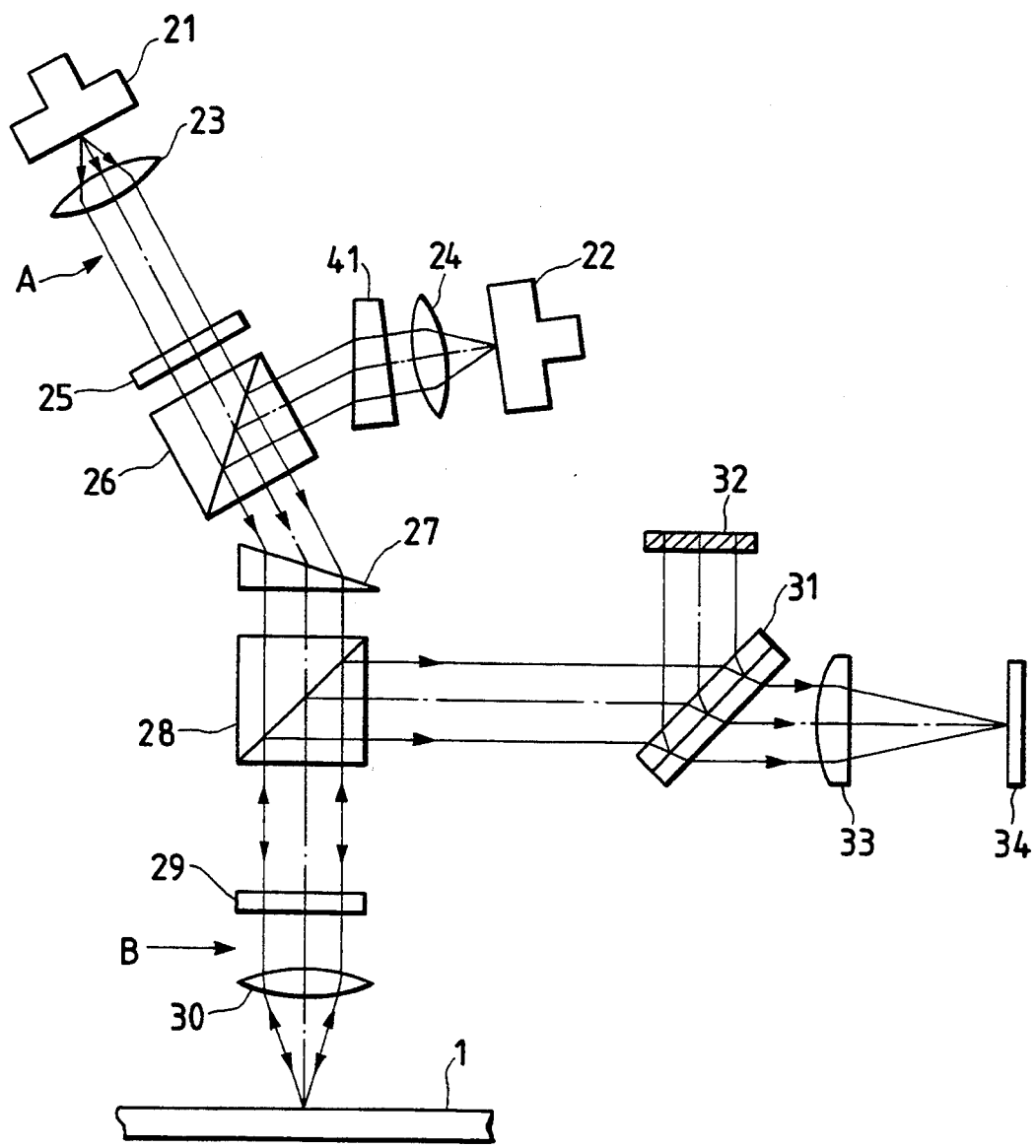
FIG. 8 is a constitutional drawing of an optical system in an optical head of the two light source type to which the present invention is applied.

FIG. 8 is a constitutional drawing to show an embodiment of an optical system in an optical head in an optical information recording/reproducing apparatus according to the present invention. In FIG. 8, the same portions are given the same numerals as in the apparatus as described with reference to FIG. 3.

In FIG. 8, reference numeral 21 designates a semiconductor laser for radiating a reproducing light beam, and 22 a semiconductor laser for radiating a recording light beam. The semiconductor laser 21 emits a beam with a wavelength of 780 nm as a reproducing light beam, and the semiconductor laser 22 emits a beam with a wavelength of 830 nm as a recording light beam. Numerals 23 and 24 denote lens and collimator lens, respectively, 25 a diffraction grating, and 26 a dichroic prism, which are the same as those explained with reference to FIG. 3.

Numeral 41 is a wedge glass plate, which is characteristic in the present invention and which is provided to slightly incline a beam emission angle with respect to the optical axis.

Further, numeral 27 represents a beam shaping prism, 28 a polarization beam splitter, 29 a quarter wave plate, 30 an objective lens, 31 a band pass filter transmitting only light having a wavelength of 780 nm, 32 a stopper, 33 a toric lens, 34 a photo detector, and 1 an optical card as an optical information recording medium, which is the same as that as explained above.

The following explains characteristic points of the present invention.

The present invention is directed to alignment of positions in the tracking direction between a reproducing beam spot and a recording beam spot, the details of which are explained below.

The reproducing beam and the recording beam pass through the dichroic prism 26, and are focused through the same optical path on the optical card 1. Since the objective lens 30 slightly changes its focal length depending upon the wavelength (780 nm or 830 nm), it is thus impossible that both beams incident as parallel beams are converged in a just in-focus state on the optical card at the same time.

As a countermeasure thereto, the recording beam is fully collimated by the collimator lens 24 and the reproducing beam is adjusted in a slightly diverging state when diverged, whereby the recording beam spot and the reproducing beam spot may be adjusted to converge in a just in-focus state on the optical card at the same time.

In the present invention, the wedge glass plate 41 is located at a position where an optical path is of a parallel beam state, in order to adjust a positional deviation in the tracking direction between the recording beam spot and the reproducing beam spot, as described above.

The principle of the present invention is briefly explained in the following with reference to FIG. 9A. FIG. 9B, and FIG. 9C.

Figure 9A:
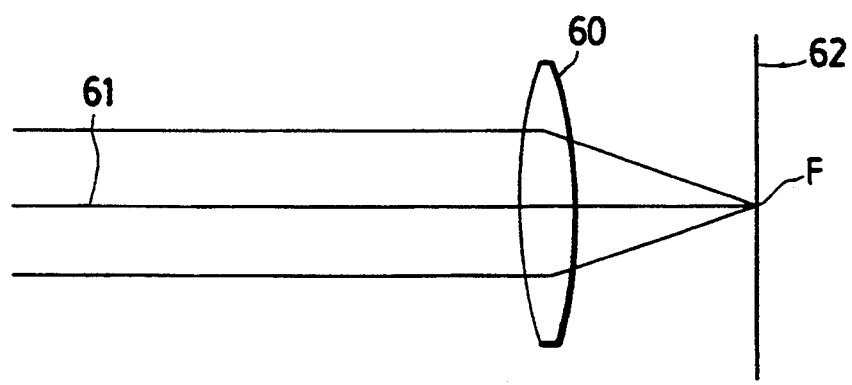
FIG. 9A, FIG. 9B, and FIG. 9C are drawings to show the fundamental principle in the present invention.
Figure 9B:
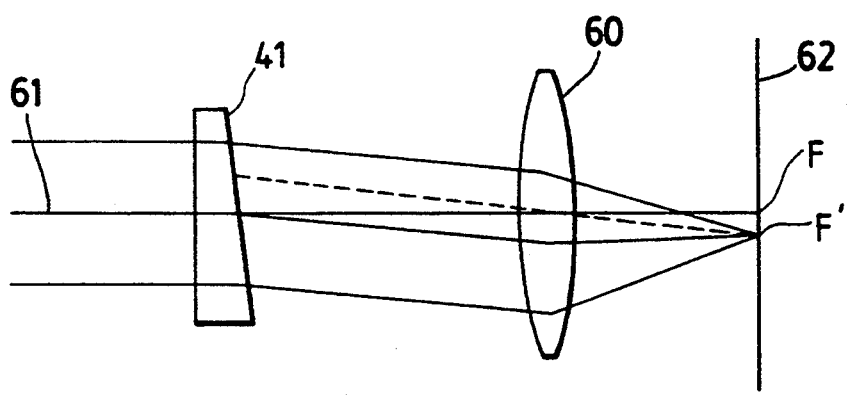
Figure 9C:
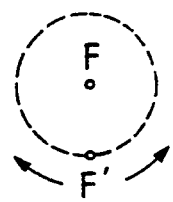

When a parallel beam is incident into a convex lens 60, the beam is always converged at a position F where a ray which has passed through the center of the lens 60 impinges on an image surface 62, as shown in FIG. 9A.

When the wedge glass plate 41 is inserted into the optical path, the imaging position moves to a position F', as shown in FIG. 9B.

Further, when the wedge glass plate 41 is rotated about the optical axis 61, the position F' rotates about the position F as shown in a top plan view of the beam spot on the image surface in FIG. 9C.

The present invention utilizes the above features. In detail, the wedge glass plate is disposed and rotated in the recording beam to move the recording beam spot, so that the position adjustment may be effected in the tracking direction to the reproducing beam spot with a high accuracy, in a short time, and in a simple manner.

The wedge glass plate is placed in the optical path of the recording beam in the above embodiment, while the glass plate may be positioned in an optical path of the reproducing beam in another embodiment. For example, the wedge glass plate may be located at a position A as shown in FIG. 8 and rotated to rotate the reproducing beam, whereby the position adjustment may be similarly carried out in the tracking direction between the recording beam spot and the reproducing beam spot.

The same effect is also obtained in such an arrangement that the wedge glass plate is disposed and rotated in an optical path where both the reproducing beam and the recording beam coexist for example at a position B as shown in FIG. 8.

Figure 10A:
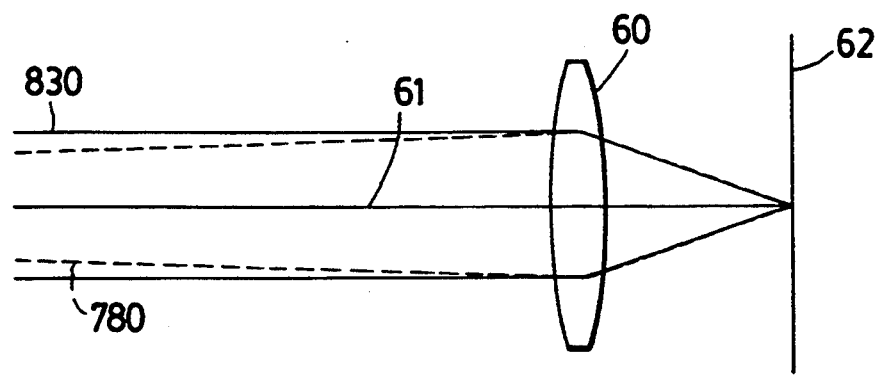
FIG. 10A, FIG. 10B, and FIG. 10C are drawings to illustrate the principle in another embodiment according to the present invention.
Figure 10B:
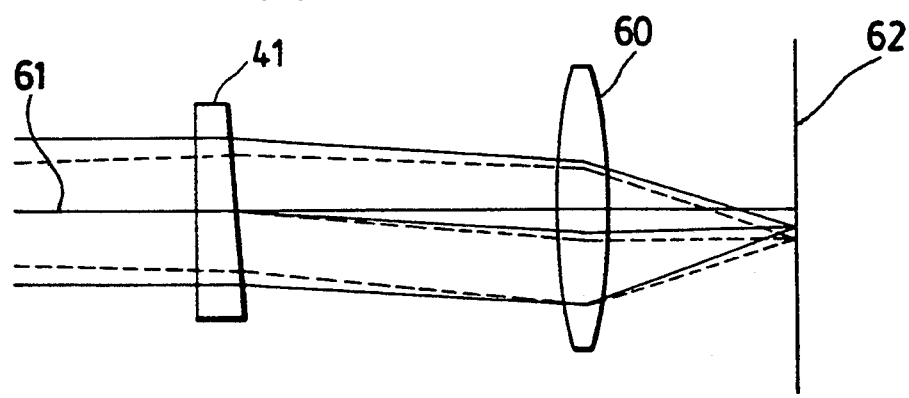
Figure 10C:
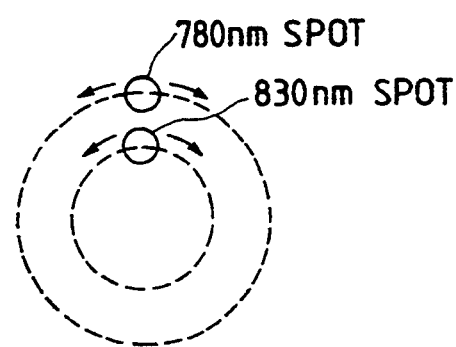

FIG. 10A, FIG. 10B, and FIG. 10C are drawings to illustrate the principle in this arrangement. FIG. 10A shows an optical path in which the reproducing beam of 780 nm represented by reference numeral 780 and the recording beam of 830 nm represented by reference numeral 830 coexist, and FIG. 10B shows that when the wedge glass plate 41 is inserted into the optical path the recording beam spot and the reproducing beam spot move on the image surface 62. FIG. 10C is a top plan view of the beam spots on the image surface.

As shown in FIG. 10A, FIG. 10B, and FIG. 10C, when the wedge glass plate is inserted into the optical path in which the reproducing beam and the recording beam different in wavelength from each other coexist, a slight deviation is caused by the chromatic aberration between the converging positions of the beams, and when the wedge glass plate is rotated, the spots move as shown in FIG. 10C, whereby the same adjustment as above is effected.

As explained above, the present invention involves an optical information recording/reproducing apparatus for recording and/or reproduction of information in a recording medium with at least two light sources, radiating a recording beam and a reproducing beam toward the recording medium, in which a wedge glass plate is disposed and rotated in an optical path of the beams to adjust one or both positions of a recording beam spot and a reproducing beam spot formed by the beams on the recording medium.

In one aspect, the at least two light sources are arranged to emit respective light beams having wavelengths different from each other.

In a further aspect, the wedge glass plate is arranged to be located at a position where either the reproducing beam or the recording beam exists alone.

In a still further aspect, the wedge glass plate is arranged to be located in an optical path in which the reproducing beam and the recording beam coexist, and the reproducing beam and the recording beam have respective wavelengths different from each other.

In a still further aspect, the wedge glass plate is arranged to be located at a position where either the reproducing beam or the recording beam exists alone and where the beam is in a parallel beam state.

According to the present invention as described, the wedge glass plate is disposed and rotated in the optical path of the collimated recording beam and/or reproducing beam to move the recording or reproducing spot on the recording medium such as the optical card, so that the fine adjustment of position between the recording beam spot and the reproducing beam spot may be performed in with a short time, in a high precision, and in a simple manner, as compared to the conventional adjustment by movement of the light source. Therefore, the apparatus according to the present invention has advantages of great reduction in time and cost for adjustment.

Further embodiments according to the present invention are explained below in detail with reference to the drawings.

Figure 1:
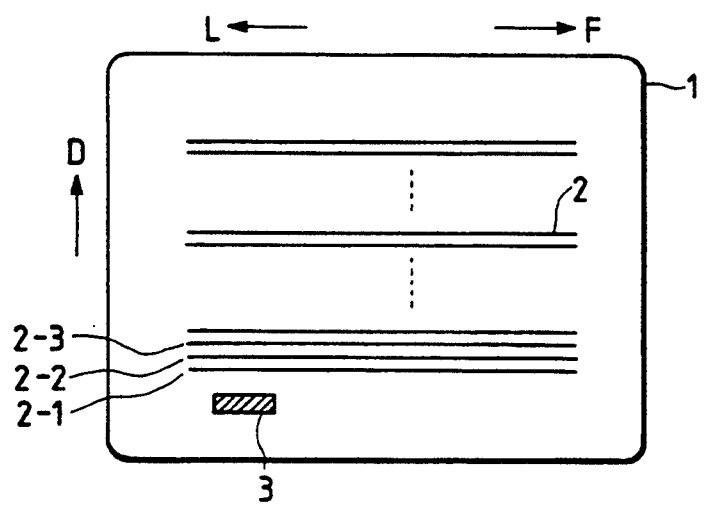
FIG. 1 is a plan view of an optical card.
Figure 2:
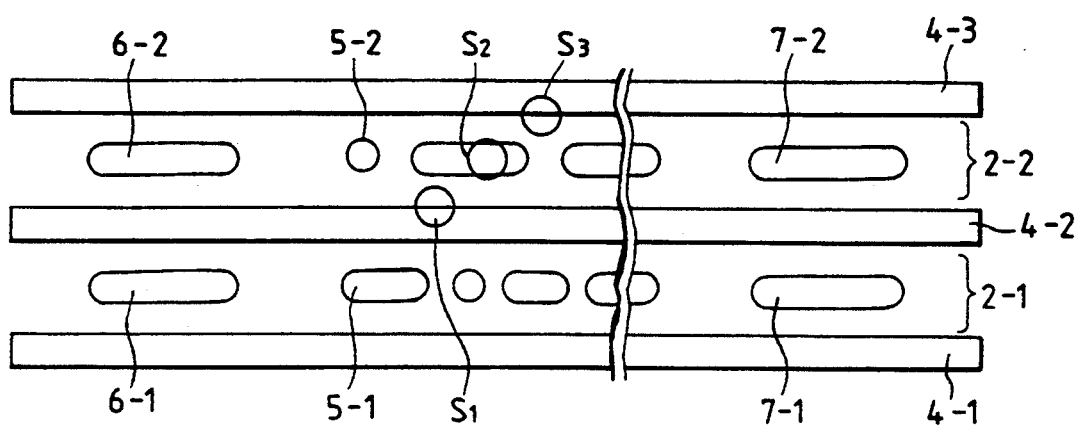
FIG. 2 is an enlarged view of a part of the optical card.
Figure 3:
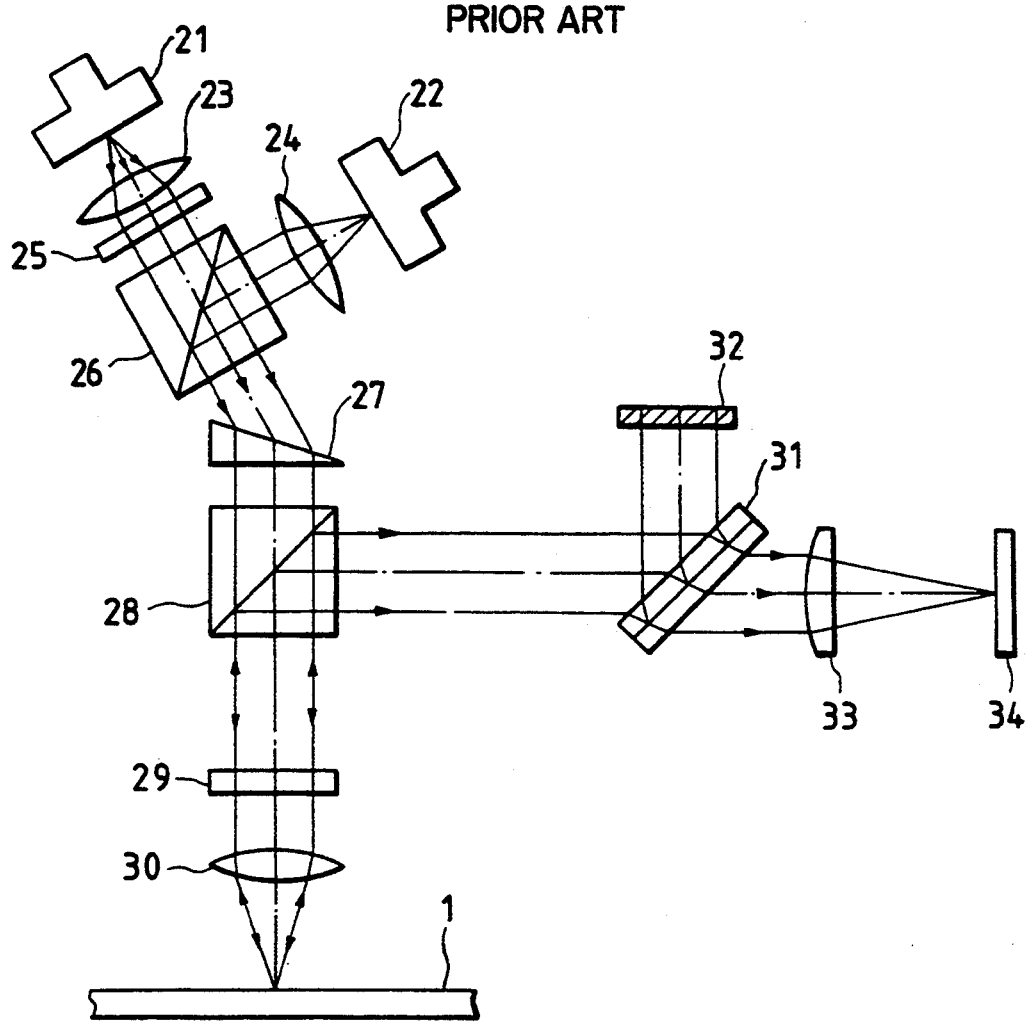
FIG. 3 is a constitutional drawing of an optical system in an optical heed of the two light source type.
Figure 4:
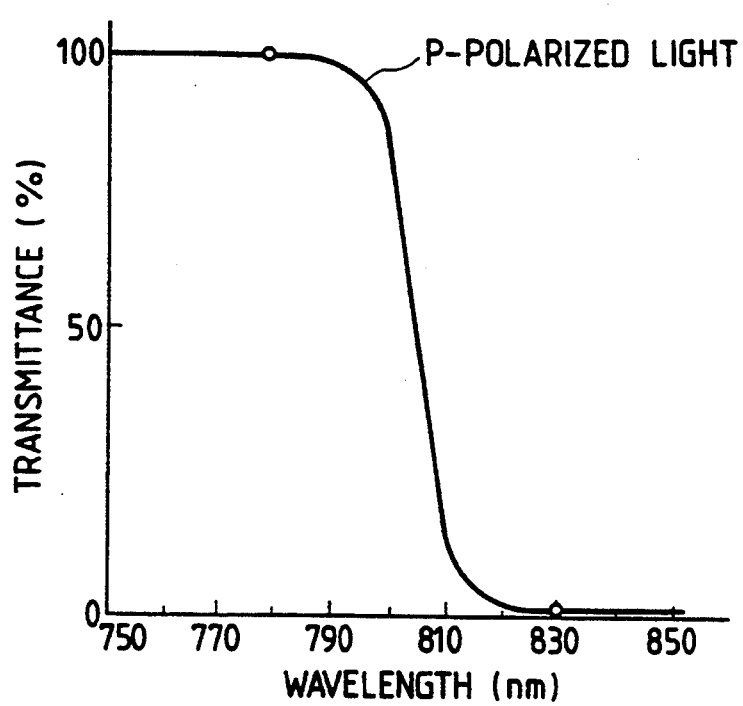
FIG. 4 is a characteristic diagram to show a spectral property of a dichroic prism 26.
Figure 5:
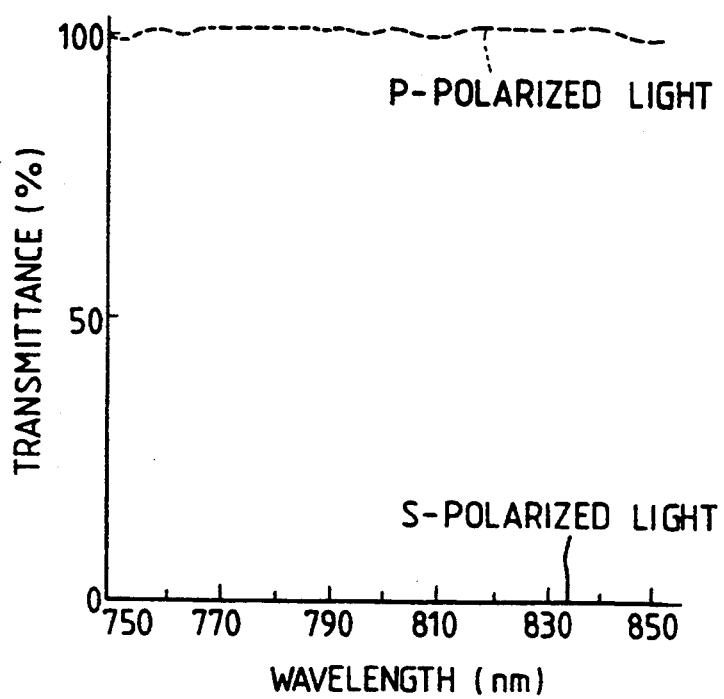
FIG. 5 is a characteristic diagram to show spectral properties of a polarized beam splitter 28 and a beam shaping prism 27.
Figure 6:
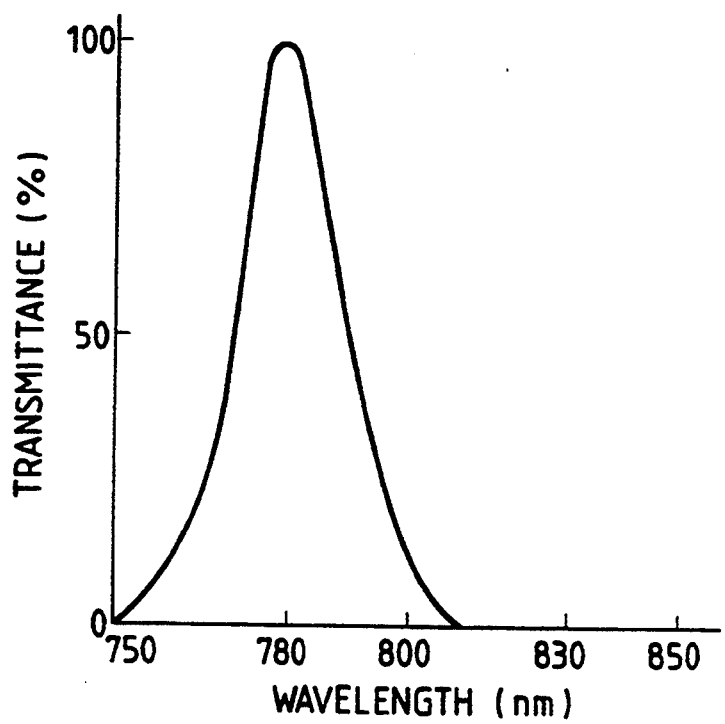
FIG. 6 is a characteristic diagram to show a spectral property of a band pass filter 31.
Figure 7:
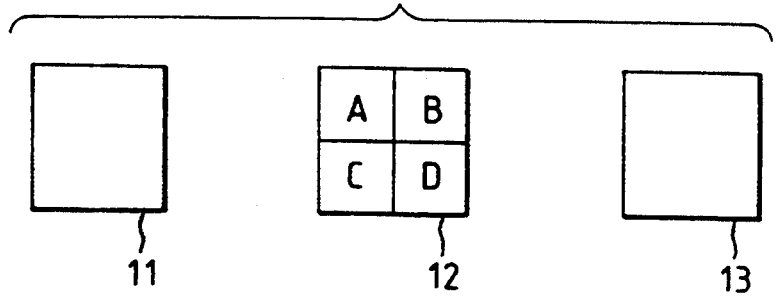
FIG. 7 is an explanatory drawing to show a light receiving surface of a photo detector 34.
Figure 11:
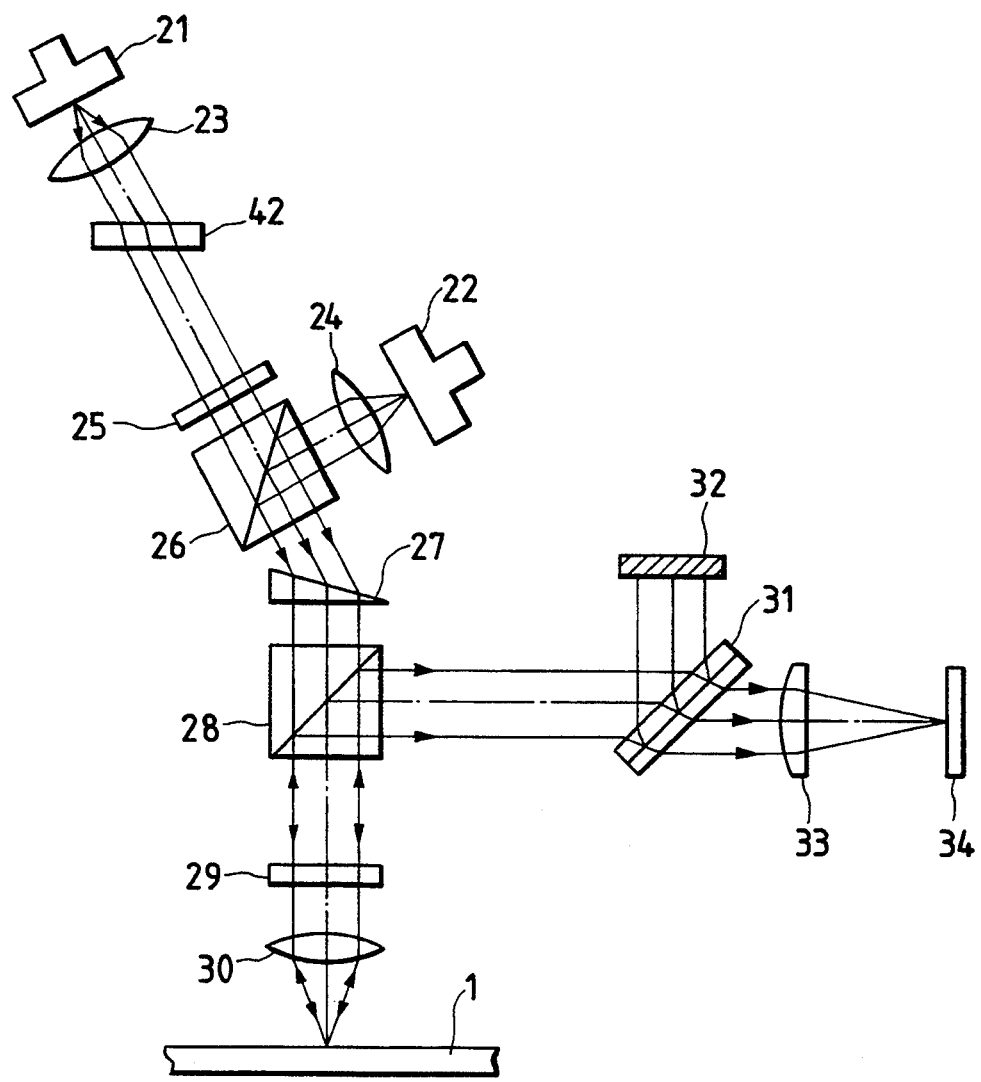
FIG. 11 is a schematic, constitutional drawing of an optical system in an optical head of the two light source type to which the present invention is applied.

FIG. 11 is a schematic, constitutional drawing to show an embodiment of an optical system in an optical head in an optical information recording/reproducing apparatus according to the present invention. In FIG. 11, the same portions are given the same numerals as in the apparatus as shown in FIG. 3.

In FIG. 11, numeral 21 designates a semiconductor laser as a light source radiating a reproducing light beam, and 22 a semiconductor laser as a light source radiating a recording light beam. The semiconductor laser 21 emits a light beam having a wavelength of 780 nm as a reproducing light beam, and the semiconductor laser 22 emits a light beam having a wavelength of 830 nm as a recording light beam. Numerals 23, 24 denote collimator lenses, 25 does a diffraction grating, and 26 a dichroic prism, which are the same as those as described with reference to FIG. 3.

Numeral 42 represents a flat parallel glass plate, which is characteristic in the present invention and which is inclined with respect to the optical axis for a parallel shift of the beam.

Further, numeral 27 is a beam shaping prism, 28 a polarized beam splitter, 29 a quarter wave plate, 30 an objective lens, 31 a band pass filter which transmits only light having a wavelength of 780 nm, 32 a stopper, 33 a toric lens, 34 a photo detector, and 1 an optical card as an optical information recording medium, which is the same as described above.

The present invention is directed to the position alignment in the tracking direction between the reproducing beam spot and the recording beam spot. The following explains the features of the present invention.

The reproducing beam and the recording beam pass through the dichroic prism 26 and are then focused through the same optical path on the optical card 1. The objective lens 30 has a focal length varying depending upon a wavelength (780 nm or 830 nm), and it is, therefore, impossible that both the beams incident in a parallel beam state are converged in a just in-focus state on the optical card at the same time.

As a countermeasure thereto, the recording beam is fully collimated by the collimator lens 24 and the reproducing beam is diverged in a slightly diverging state by the lens 23, so that the recording beam spot and the reproducing beam spot are converged in a just in-focus state on the optical card at the same time.

The present invention effectively utilizes the slight diverging state of the reproducing beam, in which the flat parallel glass plate 42 is disposed at a position where the beam is in a diverging beam state, to adjust the position deviation.

The principle in the present invention is briefly explained in the following with FIG. 12A, FIG. 12B, and FIG. 12C.

Figure 12A:
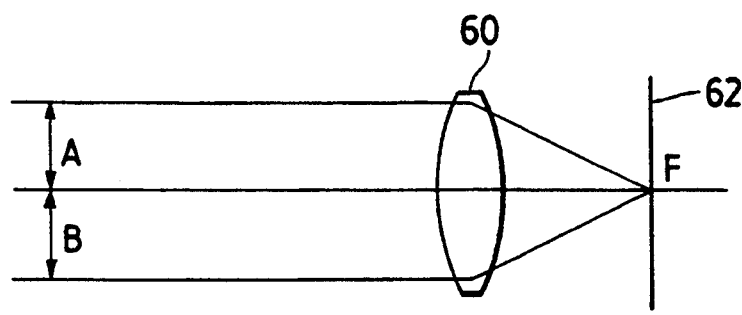
FIG. 12A, FIG. 12B, and FIG. 12C are schematic drawings to illustrate the fundamental principle in the present invention.

When a parallel beam is incident into a convex lens 60, the beam is always converged at a position F where a ray having passed through the center of the lens reaches an image surface 62, as shown in FIG. 12A.

For example, even if a beam A is shifted to a position of a beam B, the beam is also converged at the position of point F (which is also the case in an arrangement that the beam is inclined to the lens).

Figure 12B:
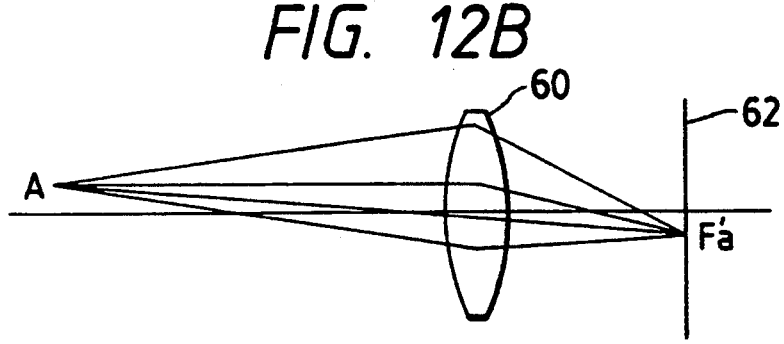
Figure 12C:
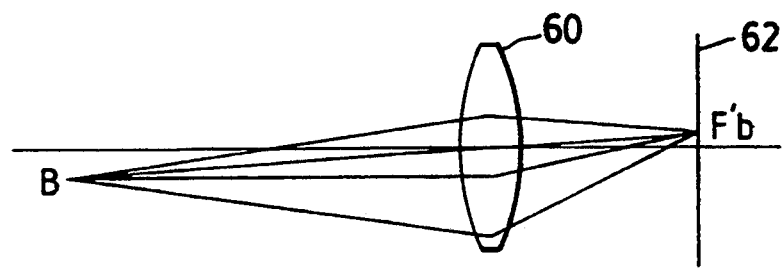

Circumstances are different when a diverging beam as shown in FIG. 12B or FIG. 12C is incident into the lens. For example, even if the same diverging beam enters the lens, the beam would be focused at a different imaging position on the image surface, for example, at Fa' in a case that the beam enters the convex lens in the upper portion (FIG. 12B) and at Fb' in a case that the beam enters the lens in the lower portion (FIG. 12C).

The present invention utilizes the above characteristics. In the present invention, the flat parallel glass plate is disposed as inclined with respect to the optical axis in the reproducing beam (diverging beam) to intentionally shift the beam with respect to the objective lens, and the flat parallel glass plate is further rotated about the optical axis to move the beam spot formed by the diverging beam, whereby the position adjustment may be effected with a high accuracy in the tracking direction between the recording beam spot and the reproducing beam spot.

The adjustment method in the present invention is below explained with reference to FIG. 13A, FIG. 13B, and FIG. 13C.

Figure 13A:
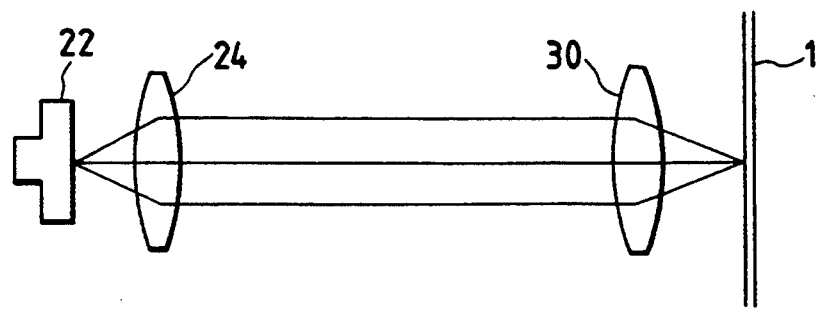
FIG. 13A, FIG. 13B, and FIG. 13C are schematic drawings to illustrate a motion of a beam spot by means of adjusting means according to the present invention.
Figure 13B:
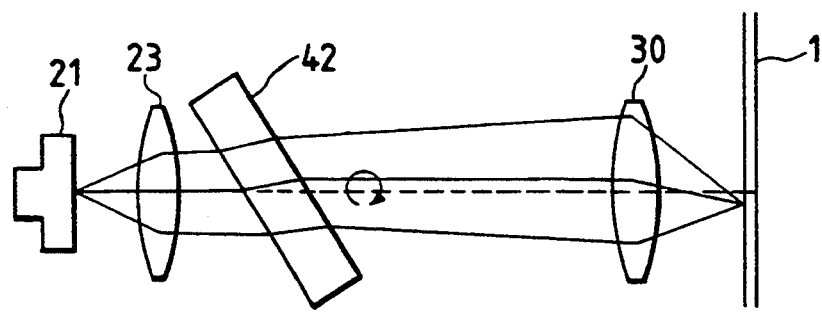
Figure 13C:
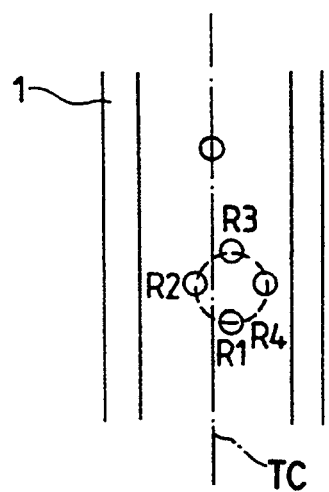

FIG. 13A, FIG. 13B, and FIG. 13C are schematic drawings of reproducing and recording beam optical systems and a drawing to show positions of the respective beam spots.

First adjusted is the recording beam, which will be a reference for adjustment.

FIG. 13A schematically shows a radiation system of the recording beam. As shown in FIG. 13A, a gap between the semiconductor laser 22 and the collimator lens 24 is adjusted by means of an unrepresented jig to make the beam collimated. The collimated beam enters the objective lens 30. A distance is adjusted between the objective lens 30 and the optical card 1 so that a minimum spot is focused on the optical card 1 and the spot is located at the center of a track.

The semiconductor laser 21 for the reproducing beam then radiates a reproducing beam in that state, and a distance is adjusted between the semiconductor laser 21 and the lens 23 so that a minimum spot is focused on the optical card 1, as shown in FIG. 13B, which schematically shows a radiation system of the reproducing beam. The reproducing beam is made in a slightly diverging state, taking into account the chromatic aberration caused by the objective lens 30 between the reproducing beam and the recording beam.

Finally, the flat parallel glass plate 42 is disposed in the optical flux as to be inclined with respect to the optical axis and is rotated about the optical axis so that the position adjustment is completed in the tracking direction between the recording beam spot and the reproducing beam spot.

FIG. 13C is a schematic plan view to show a positional relation between the spots on a track. While the flat parallel glass plate 42 is rotated about the optical axis, the reproducing beam spot moves as shown by R1 to R4 in FIG. 13C, whereby the spot is adjusted to be located at the track center TC.

The flat parallel glass-plate is inserted only in the optical path of the reproducing beam in the above embodiment, while the flat parallel glass plate may be inserted into an optical path including the reproducing beam and the recording beam to have the same effect. In detail, the recording beam is not affected in the optical path because it is collimated, while the reproducing beam is affected in the optical path because it is a diverging beam. Thus, only the reproducing beam is moved to effect the position adjustment.

The above embodiments are examples in which the reproducing beam is a diverging beam. The present invention is also applicable with the same effect to an example in which the recording beam is a diverging beam while the reproducing beam is a parallel beam.

The flat parallel glass plate is made of glass in the above embodiments. It should be, however, noted that the flat parallel glass plate may be of course made of a plastic which has the same optical properties as the glass to be used.

As explained above, the present invention involves an optical information recording/reproducing apparatus for recording and/or reproduction of information with separate recording and reproducing light sources radiating respective beams toward a recording medium, which comprises means for forming beam spots on the recording medium from the beams, one of which is a diverging beam and the other of which is a parallel beam, and a flat parallel glass plate as position adjusting means of the beam spots disposed in the diverging beam as to be inclined with respect to the optical axis of the beam, in which the flat parallel glass plate is rotated about the optical axis, whereby the position adjustment is effected.

In one aspect, the flat parallel glass plate may be located in an optical path of a diverging beam in which either the reproducing beam or the recording beam is present alone.

In a further aspect, the flat parallel glass plate may be located in an optical path in which both the reproducing beam and the recording beam coexist, and either one of the reproducing beam and the recording beam is a diverging beam.

Further, the present invention involves an adjustment method in an optical information recording/reproducing apparatus for recording and/or reproduction of information with two light sources different in radiation wavelength, one of which radiates a diverging beam and the other of which radiates a parallel beam, forming beam spots on a recording medium, in which a flat parallel glass plate is inserted in the diverging beam, the plate is inclined with respect to the optical axis of the diverging beam, and the glass plate is rotated about the optical axis, whereby a position of the beam spot formed from the diverging beam is adjusted.

According to the present invention as described, the flat parallel glass plate is inserted into the optical path of the recording beam and/or the reproducing beam which are of a parallel beam and of a slightly diverging beam, and the glass plate is rotated to move the recording spot or the reproducing spot on the recording medium such as the optical card, whereby the positions of the recording beam spot and the reproducing beam spot may be finely adjusted. Such an arrangement allows the simple position adjustment with a high accuracy in a short time, as compared to the conventional adjustment conducted by moving the light source. Therefore, the apparatus according to the present invention has advantages of great reduction in time and cost for adjustment.

Further embodiments of the present invention are below explained in detail with reference to the drawings.

It is an object of embodiments as described below according to the present invention to provide an optical information recording/reproducing apparatus, which modifies the positional arrangement of apertures and beam shaping prisms in the conventional apparatus so as to permit a construction with a single beam shaping prism being shared, whereby enhancing the cost reduction and the space utilization efficiency.

The present invention provides, as means for solving the aforementioned problems in the conventional apparatuses, an optical information recording/reproducing apparatus for recording and/or reproducing information with separate light sources, radiating a recording beam and a reproducing beam toward an optical information recording medium, which comprises collimator lenses for converting diverging beams emitted from the light sources into parallel beams and apertures disposed between the collimator lenses and a beam shaping prism for changing a light intensity distribution of the beams.

In one arrangement, the apertures are provided in respective optical paths, in each of which the recording beam or the reproducing beam having passed through the collimator lens is independently present, and the recording beam and the reproducing beam enter the common beam shaping prism after passing through the apertures.

The following features may be further added:

The apertures are designed to have desired light intensity distributions after the light beams pass through the apertures and are shaped by the beam shaping prism at a shaping ratio thereof;

there are at least two light beams and light beam spots on the recording medium therefrom and the aperture is provided for one or more of the light beams;

the light sources have at least two different wavelengths and the aperture is provided for one or more of the beams;

the aperture is of an oval shape; and the aperture is of an oval shape with a ratio of a major axis to a minor axis which is equivalent to a ratio of a vertically diverging angle to a horizontally diverging angle in an optical flux emitted from each of the light sources.

According to the present invention, apertures determined taking into account a beam shaping ratio are disposed in parallel beams having oval intensity distributions after passing through respective collimator lenses, whereby a single beam shaping prism may be employed for the recording beam and for the reproducing beam.

Also, the apertures are designed to have desired light intensity distributions after the beams pass through the apertures and when the beams are modified by the shaping ratio of the beam shaping prism.

Further, each of the apertures may be of an oval shape with the major axis to minor axis ratio equivalent to the ratio of vertical diverging angle to horizontal diverging angle in the optical flux emitted from the light sources to obtain a desired beam spot.

The shape of the apertures is determined by a size of a spot to be obtained on the recording medium.

Figure 14:
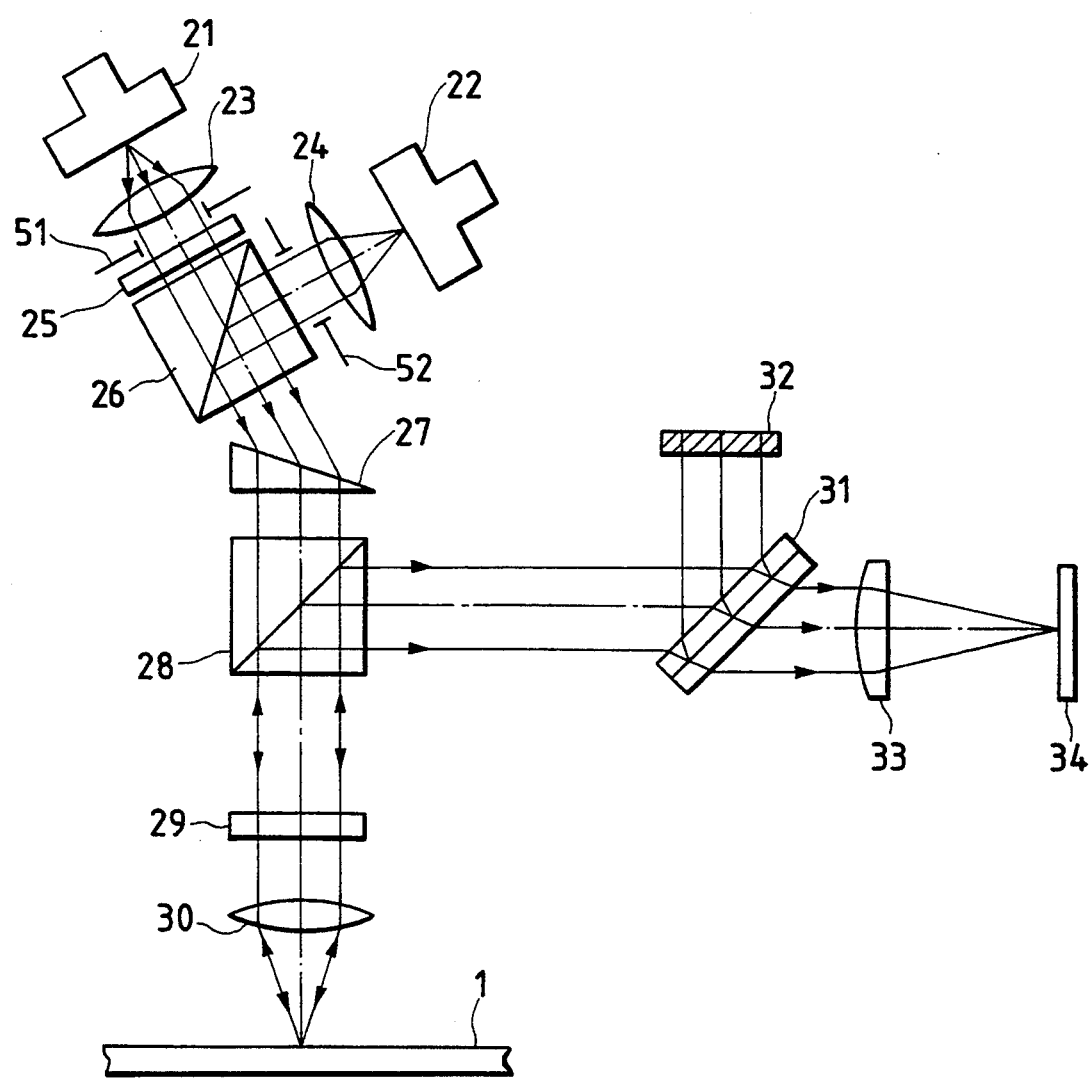
FIG. 14 is a constitutional drawing to show an optical system in an optical head of the two light source type to which the present invention is applied.

FIG. 14 is a constitutional drawing to show an embodiment of a optical system in an optical head of two light source type in an optical information recording-/reproducing apparatus according to the present invention. In FIG. 14, the same portions are given the same numerals as in the apparatus as described with reference to FIG. 3.

In the present embodiment, an aperture 51 of an oval shape is disposed between a lens 23 and a diffraction grating 25, and an aperture 52 of a oval shape is disposed between a collimator lens 24 and a dichroic prism 26.

Figure 15:
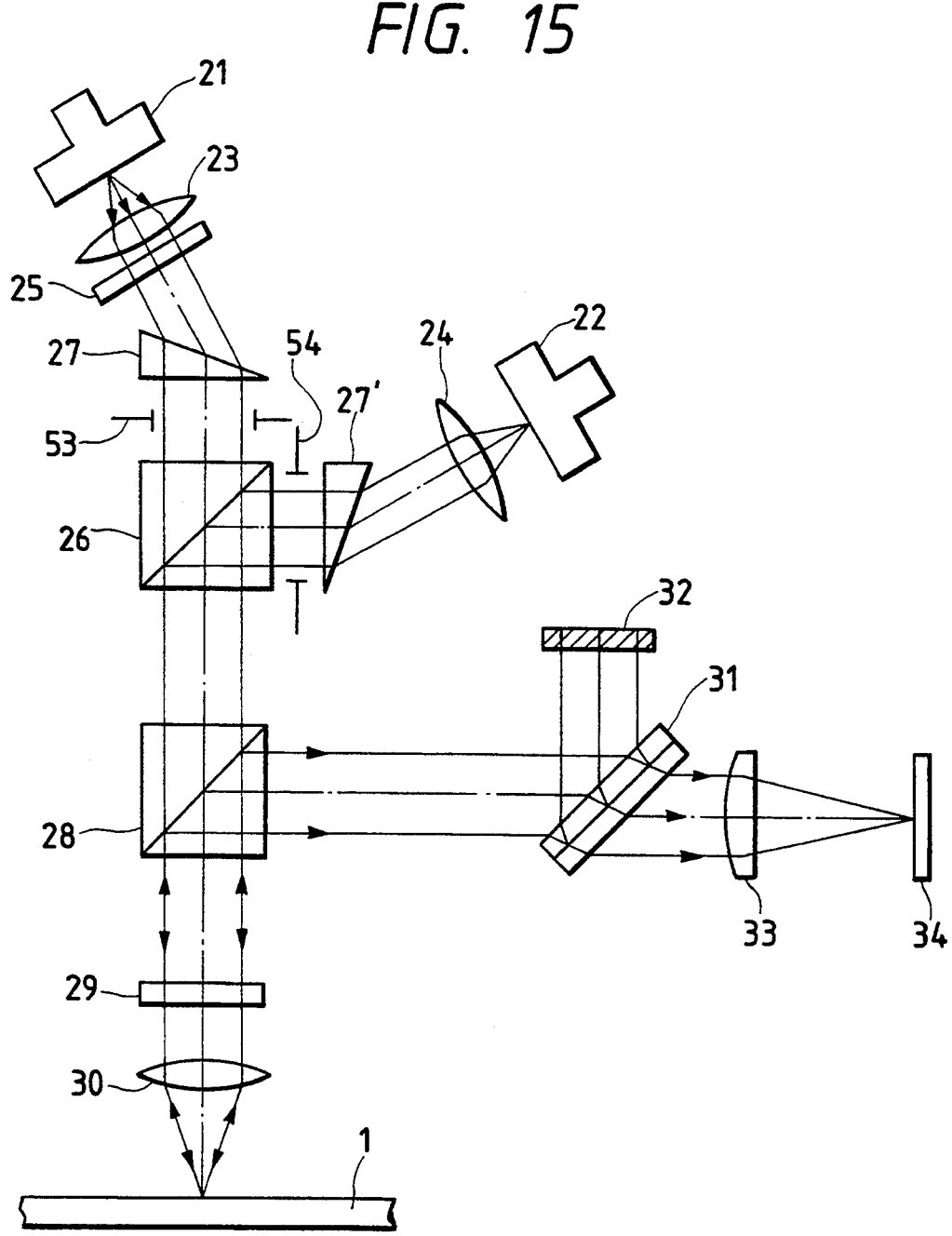
FIG. 15 is a constitutional drawing to show an optical system in an optical head of the two light source type as a comparative example to the embodiment as shown in FIG. 14.

FIG. 15 is a schematic drawing to show an optical system in an optical head of two light source type as a comparative example to the embodiment as shown in FIG. 14. The two light source type enables the prevention of reproducing beam degradation and the high speed recording by providing separate light sources for a recording beam and for a reproducing beam. There are two beam shaping prisms 27, 27' used in the comparative example.

In FIG. 15, numerals 21, 22 designate semiconductor lasers as light sources. The semiconductor laser 21 radiates a light beam having a wavelength of 780 nm and the semiconductor laser 22 radiates a light beam having a wavelength of 830 nm. Numerals 23, 24 denote lens and collimator lens respectively, 25 a diffraction grating for splitting a beam, 53 and 54 apertures, 26 a dichroic prism designed to transmit P-polarized light of 780 nm and to reflect P-polarized light of 830 nm, 27 and 27' beam shaping prisms, and 28 a polarization beam splitter. Further, numeral 29 is a quarter wave plate, 30 an objective lens, 31 a band pass filter which transmits only light of 780 nm, 32 a stopper, 33 a toric lens, and 34 a photo detector.

The light beams radiated from the semiconductor lasers 21, 22 enter the lens and collimator lens 23, 24, respectively, in a diverging beam state to be modified thereby into parallel beams. The light beam of 780 nm enters the diffraction grating 25 and is split by the diffraction grating into three effective light beams (a zeroth order diffracted beam and ± first order diffracted beams).

The light beam of 780 nm and the light beam of 830 nm are shaped by the light beam shaping prisms 27, 27', respectively, to have a circular light intensity distribution, and then enter the apertures 53, 54, through each of which a beam having a predetermined light intensity distribution passes.

The predetermined light intensity distribution is defined such that the beam spot of 780 nm used as a reproducing spot is of an oval shape and the beam spot of 830 nm used as the recording spot is of a circular shape. Thus, the aperture 53 has an opening of oval shape and the aperture 54 has an opening of circular shape.

In the arrangement as shown in FIG. 15, the beams are shaped by the beam shaping prisms into beams each having a circular intensity distribution, and the shaped beams pass through the apertures to obtain circular and oval spots. Such an arrangement requires two beam shaping prisms for a recording beam and for a reproducing beam, which causes problems of (1) cost increase and of (2) space increase.

Figure 16:
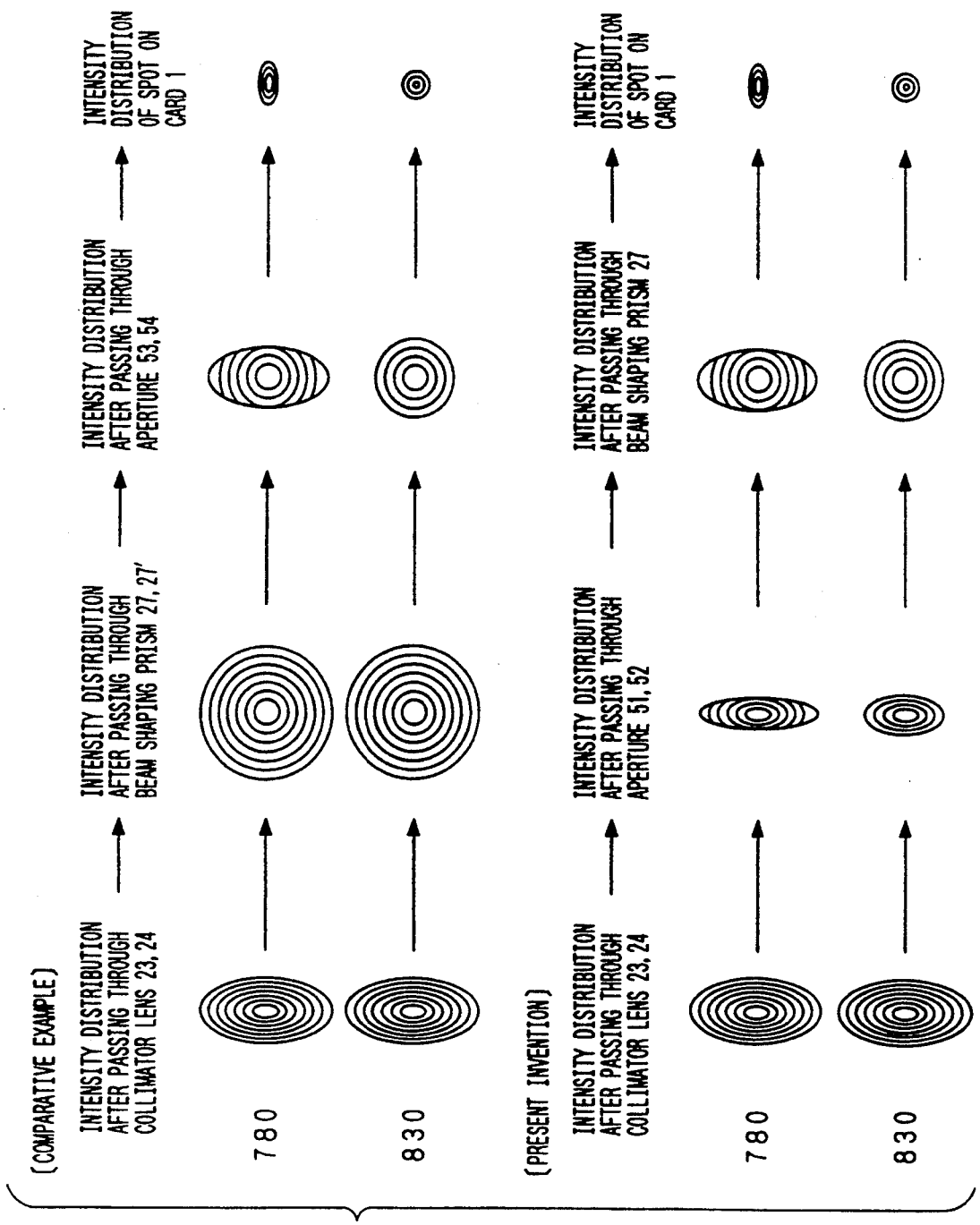
FIG. 16 is a drawing to compare effects of apertures between the present invention and the example as shown in FIG. 15.

FIG. 16 is a schematic drawing which compares effects of the apertures 53, 54 in the comparative example as shown in FIG. 15 with those of the apertures 51, 52 in the example according to the present invention as described in FIG. 14.

In the example as shown in FIG. 15, both the reproducing beam of 780 nm and the recording beam of 830 nm are enlarged (doubled) by the beam shaping prisms 27, 27' in the horizontal direction to have respective circular light intensity distributions.

After that, each of the beams is modified by the aperture 53, 54 designed to provide a spot of circular shape or oval shape on the card.

The apertures 53, 54 used are oval to obtain an oval spot while circular to obtain a circular spot.

In contrast, each of the apertures 51, 52 used in the arrangement according to the present invention has a shape preliminarily determined considering an enlarging rate of the beam shaping prism, specifically a vertically elongate oval shape in the application of the present invention.

Further, the apertures 51, 52 are shaped in an oval having an opening at a ratio of a major axis to a minor axis (major axis/minor axis) substantially equal to a ratio of a vertical diverging angle to a horizontal diverging angle of beams emitted from the light sources (vertical diverging angle/horizontal diverging angle).

The thus-shaped apertures 51, 52 are disposed behind the lens and collimator lens 23, 24 in the present embodiment, and the beams having passed through the apertures are enlarged by a common beam shaping prism 27. It is seen in FIG. 16 that the intensity distributions of beam spots on the card show no difference between the example according to the present invention and the comparative example as shown in FIG. 15.

Accordingly, one beam shaping prism can be omitted with the same result as in the comparative example as shown in FIG. 15 by arranging the apertures designed considering the beam shaping ratio, between the collimator lenses and the beam shaping prism and at a position where the recording beam and the reproducing beam are separated from each other.

Figure 17:
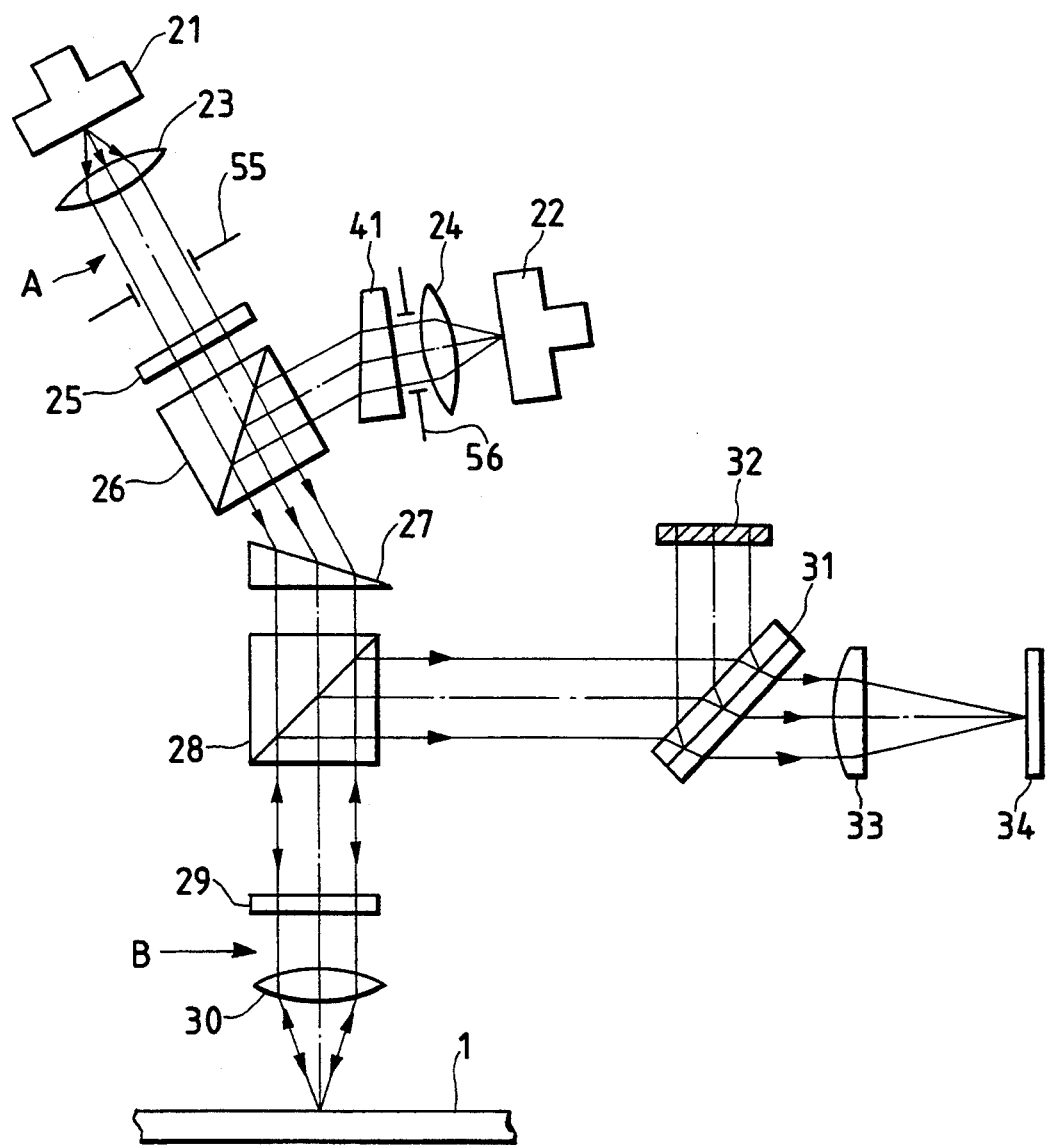
FIG. 17 and FIG. 18 are constitutional drawings to show an optical system in an optical head of the two light source type to which the present invention is applied.

FIG. 17 is a constitutional drawing to show another embodiment of an optical system in an optical head in an optical information recording/reproducing apparatus according to the present invention. In FIG. 17, the same portions are given the same numerals as in the apparatus as shown in FIG. 8.

In the present embodiment, a wedge glass plate 41 is used to adjust a position deviation as described above in the tracking direction between the recording beam spot and the reproducing beam spot. The wedge glass plate 41 is arranged to be rotatable about the optical axis as described.

Further, in the present embodiment, an aperture 55 of oval shape is disposed between a lens 23 and a diffraction grating 25 and an aperture 56 of oval shape is disposed between a collimator lens 24 and the wedge glass plate 41.

Figure 18:
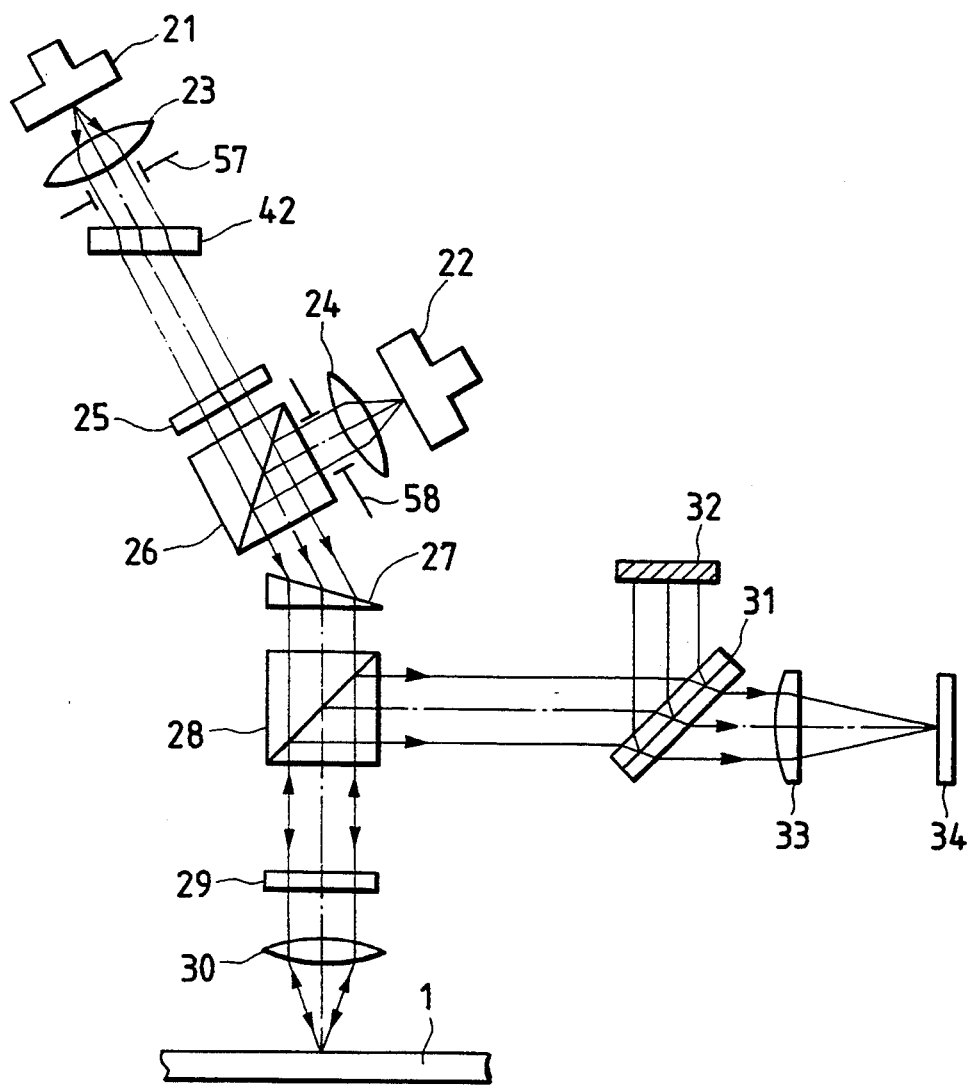

FIG. 18 is a constitutional drawing to show still another embodiment of the optical system in the optical head in the optical information recording/reproducing apparatus according to the present invention. In FIG. 18, the same portions are given the same numerals as in the apparatus as described with reference to FIG. 11.

In the present embodiment, a flat parallel glass plate 42 is used to adjust a position deviation as described above in the tracking direction between the recording beam spot and the reproducing beam spot. The flat parallel glass plate 42 is arranged to be rotatable about the optical axis as described.

Further, in the present embodiment, an aperture 57 of oval shape is disposed between a lens 23 and the flat parallel glass plate 42 and an aperture 58 of oval shape is disposed between a collimator lens 24 and a dichroic prism 26.

Accordingly, one beam shaping prism may be omitted with the same result as in the comparative example as shown in FIG. 15 by arranging the apertures designed considering the beam shaping ratio, between the collimator lenses and the beam shaping prism and at a position where the recording beam and the reproducing beam are separated from each other.

As described above, the present invention involves an optical information recording/reproducing apparatus for recording and/or reproduction of information with separate light sources, radiating a recording beam and a reproducing beam toward an optical information recording medium, in which apertures are disposed between collimator lens and lens for converting diverging beams radiated from the light sources into parallel beams and a beam shaping prism for changing light intensity distributions of the beams.

In one aspect, either of the apertures may be disposed in an optical path, in which either the recording beam or the reproducing beam having passed through the collimator lens independently exists, and after passing through the apertures the recording beam and the reproducing beam enter the common beam shaping prism.

In another aspect, the apertures are designed such that the beams have desired light intensity distributions after passing through the apertures and after being modified at the modification ratio of the beam shaping prism.

In still another aspect, at least two beams and light beam spots on the recording medium therefrom are provided and the apertures are provided for one or more beams.

In still another aspect, the light sources have at least two wavelengths different from each other, and the apertures are provided for one or more beams.

In still another aspect, the apertures are of an oval shape.

In still another aspect, the apertures are shaped in an oval at a ratio of major axis to minor axis equivalent to a ratio of vertical diverging angle to horizontal diverging angle of beams emitted from the light sources.

As detailed above, the apertures designed considering the beam shaping ratio are located between the collimator lenses and the beam shaping prism, that is, in the beams having oval light intensity distributions, and the common beam shaping prism is used for the recording beam and for the reproducing beam, whereby great advantages may be achieved such as the cost reduction and the increase in space utilization efficiency.

What is claimed is:

1. An optical information recording and/or reproducing apparatus comprising:
   optical means for irradiating a recording beam and a reproducing beam toward an information recording medium; and
   a flat parallel glass plate disposed in an optical path of at least one of the beams, which has a diverging state, said flat parallel glass plate being inclined with respect to an optical axis of the optical path and rotated about the optical axis of the optical path to adjust a position of a beam spot on the information recording medium.

2. An optical information recording and/or reproducing apparatus according to claim 1, wherein the recording beam and the reproducing beam have wavelengths respectively different from each other.

3. An optical information recording and/or reproducing apparatus according to claim 1, wherein said flat parallel glass plate is located in an optical path of only one of the recording beam and the reproducing beam.

4. A method for adjusting a beam spot on an information recording medium in an optical information recording and/or reproducing apparatus, said method comprising the steps of:

irradiating a recording beam and a reproducing beam to the information recording medium using optical means;

disposing a flat parallel glass plate in an optical path of at least one of the beams, which has a diverging state, wherein the flat parallel glass plate being inclined with respect to an optical axis of the optical path; and rotating the flat parallel glass plate about the optical axis of the optical path to adjust a position of a beam spot on the information recording medium.

* * * * *

UNITED STATES PATENT AND TRADEMARK OFFICE
CERTIFICATE OF CORRECTION

PATENT NO. : 5,373,492
DATED : December 13, 1994
INVENTOR(S) : Moritoshi MIYAMOTO, et al.

It is certified that error appears in the above-indentified patent and that said Letters Patent is hereby corrected as shown below:

COLUMN 1:

Line 19, "record" should read --recording--; and
Line 30, "record" should read --recording--.

COLUMN 3:

Line 15, "Joint" should read --joint--.

COLUMN 5:

Line 23, "heed" should read --head--.

COLUMN 8:

Line 12, "in" (first occurrence) should be deleted.

Signed and Sealed this

Twenty-second Day of August, 1995

Attest:

BRUCE LEHMAN

Attesting Officer    Commissioner of Patents and Trademarks